May 5, 1936.  B. BIGELOW  2,039,624
LIQUID DISPENSING DEVICE
Filed April 14, 1934
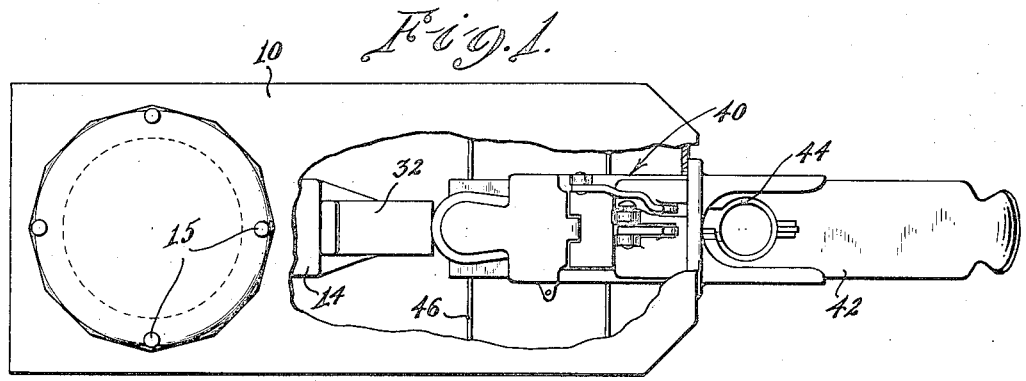
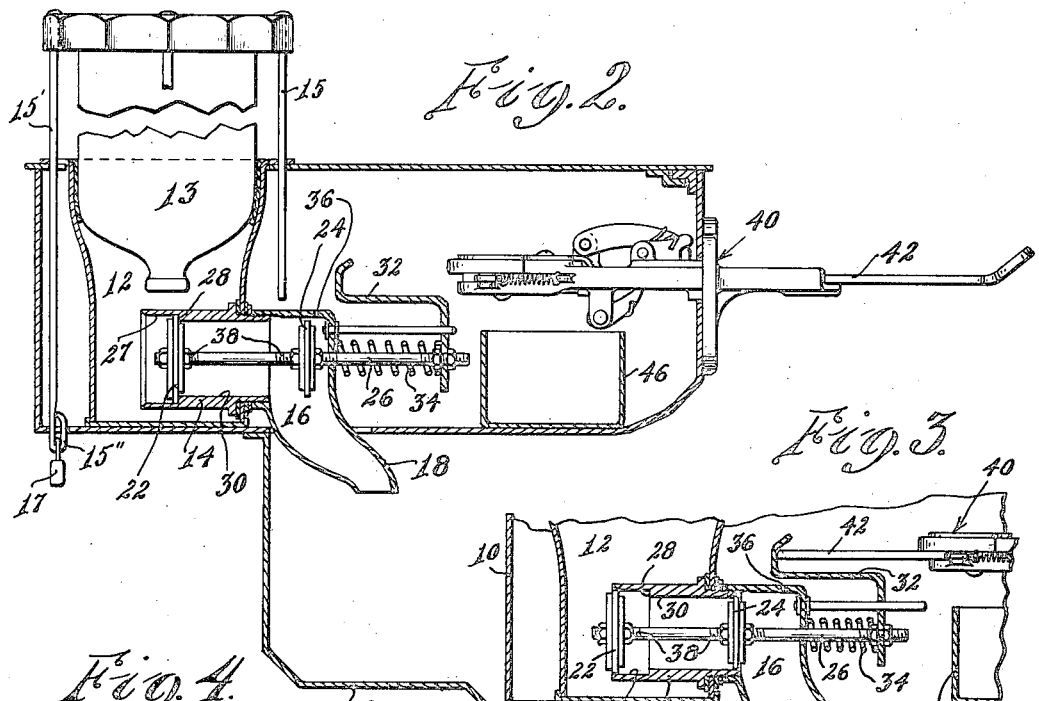
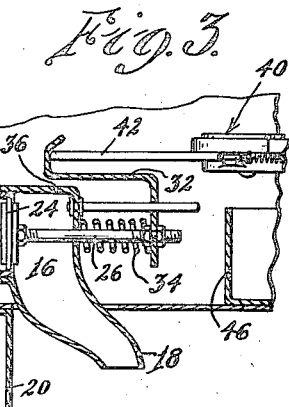
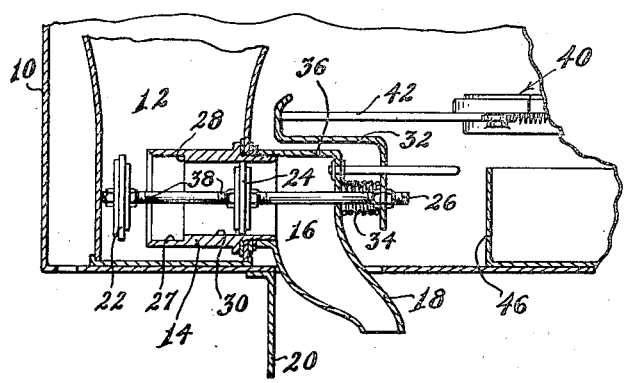
Inventor
Bryant Bigelow
By John H. McKenna Patented May 5, 1936

2,039,624

UNITED STATES PATENT OFFICE 2,039,624

LIQUID DISPENSING DEVICE

Bryant Bigelow, Boston, Mass.

Application April 14, 1934, Serial No. 720,516

2 Claims. (Cl. 221—114)

This invention relates to improvements in liquid dispensing devices. More especially it relates to improved mechanism for dispensing liquid, from a suitable supply source, in predetermined measured quantities. The invention will be found useful, effective, and reliable wherever it may be desired to dispense liquid from a container in measured amounts, such as a predetermined serving of cream for a cup of coffee, or of syrup for mixed drinks at soda fountains; a predetermined size of drink of a beverage, etc.; and it has a particular utility, in combination with coin receiving and coin controlled units, in the form of so-called vending machines for liquid.

It is among the objects of the invention to provide simple yet effective means for withdrawing, from a supply of liquid, a predetermined measured quantity, in response to each cycle of movements of an actuating element.

Another object is to keep all of the supply liquid in the supply chamber and out of the measuring chamber until such time as a measured quantity is to be withdrawn.

A further object is to accomplish the withdrawal and dispensing of liquid as the result of a mere straight-line shifting simultaneously of a plurality of chamber walls. Still another object is to provide for automatic movement of the actuating element through a portion of each cycle of its movements.

It is, moreover, an important feature that the coin controlled bar or plunger of so-called vending machines conveniently and effectively may be combined with my dispensing apparatus, as a propelling means for the said actuating element.

The mentioned objects and results may be attained by employing a pair of spaced-apart valves which are inter-connected to move in unison. The valves constitute shiftable end walls for a measuring chamber into which liquid from the supply can flow by gravity when the valve wall at that end moves away from its seat. The valve walls are coordinated so that one of them always constitutes a barrier to the passage of liquid, and so that, before one wall moves sufficiently to open a passage past it for liquid, the other will have moved to a position where it intervenes and prevents escape of the liquid.

The measuring chamber stands between the supply chamber and an outlet passage to a suitable spout. And the valve walls are shiftable in directions along the axis of the measuring chamber, with the interconnecting means for the valves extending out through the wall of the outlet passage where it can constitute the actuating element, or be connected to such an element. A coil spring normally tends to hold the valve at the entrance end of the measuring chamber seated and closing that end of the chamber. At such normal times, the other valve wall will be spaced from the discharge end of the chamber, leaving that end open. By thrusting the actuating element toward the measuring chamber, both valve walls move in unison, the one away from its seat at the entrance end, and the other to a barrier position within the chamber. But the entrance valve continues to bar the entrance of liquid into the chamber during its initial movement, until the other valve has engaged within the chamber, to close the discharge end. Any further movement of the valves, in the same direction, permits liquid to enter the measuring chamber as far as this now-interior wall. Upon releasing the actuator, the coil spring returns the valve walls to their normal positions, the measuring chamber growing larger and receiving more liquid until the entrance valve cuts off the supply, immediately following which the other end of the chamber opens and the measured quantity of liquid discharges into the outlet passage and thence to the spout.

Actuation of the valve walls conveniently and advantageously may be accomplished by a usual plunger bar of a coin receiving and coin controlled unit mounted for the plunger bar to engage the said actuating element for the valve walls.

It is intended that the patent shall cover, by suitable expression in the appended claims, whatever features of patentable novelty exist in the invention disclosed.

In the accompanying drawing:

Figure 1 is a plan of a vending machine for dispensing liquid embodying features of the invention; portions being broken away for clearness;

Figure 2 is an elevation in central, vertical longitudinal section through the device of Figure 1;

Figure 3 is a view similar to Figure 2 with the valve walls shifted to their positions just prior to flow of liquid into the measuring chamber; and Figure 4 is a view similar to Figure 3 showing the valve walls at the limits of their movements to the left in the drawing.

Referring to the drawing, the housing 10 may be of any suitable form, and preferably will be of sheet metal of stoutness to withstand abuses to which devices of this general sort may be subjected. A liquid supply chamber is indicated at 12, which may be designed to receive and seat an inverted bottle 13 or the like for constituting an additional source of liquid. The bottle 13 may be held securely in position by means of a cap fitting over its upper end, and a plurality of rods 15 extending from the cap into the interior of the casing, one said rod 15' having a loop 15'' for projecting out through the casing wall, in which loop a pad-lock 17 may engage.

A measuring chamber is represented at 14, having one end standing well within the supply chamber 12, and having its other end communicating with the outlet passage 16, leading to spout 18, whose mouth is spaced above a suitable support 20 on which a receptacle may be placed for receiving the dispensed liquid.

Passage of liquid from the supply chamber to and from the measuring chamber is controlled by the pair of valves 22, 24 which are shown mounted on rod 26, for unitary motion. Valve 22 preferably will be slightly larger than valve 24, for engaging with nice fit in the enlarged bore 26 at the entrance end of chamber 14. This enlarged bore 26 has appreciable extent and terminates interiorly at the shoulder 28 which constitutes a definite seat for valve 22. Valve 24 may be similar to valve 22 with the requisite smaller dimension for fitting nicely in the main bore 30 of the chamber. The peripheral portions of both valves 22, 24 preferably will be of rubber or similar tough and resilient material. The rubber conveniently may be clamped between metal plates in each case, with relatively little of the rubber extending beyond the plates. In this manner, any wear of the rubber effectively and easily may be compensated for by a mere tightening of the clamp to squeeze the rubber to the needed larger diameter.

The valve rod 26 extends through the outer wall of the outlet passage 16, in which it has a bearing, and extends a considerable distance beyond that wall. At its end any suitable element may be provided for facilitating actuation of rod 26. As illustrated this element is an arm 32 reaching out from the end of rod 26 for a purpose later to be described.

Normally, the valve 22 will be seated against the shoulder 28, effectively closing chamber 14 against the supply liquid. Valve 24, at such normal times, will be spaced away from the discharge end of chamber 14. A coil spring 34, intervening between the wall of outlet passage 16 and the actuating arm 32, ensures this normal condition of the valves.

Assuming the actuation of the valves is to be accomplished by grasping the actuating arm 32, the movement will be in direction along the axis of measuring chamber 14. Initially, valve 22 will travel away from its shoulder seat 28, but it will continue to engage interiorly in the enlarged bore 27, preventing passage of liquid, until valve 24 has entered and closed the discharge end of the chamber.

After valve 24 enters chamber 14, closing the discharge end, further movement results in valve 22 leaving chamber 14 so that liquid can rush in. Meanwhile, however, valve 24 will have advanced into the chamber, considerably reducing the area available therein for holding liquid. And this area continues to diminish until the valves reach the end of their travel to the left in the drawing. As soon as the actuating arm 32 is released, however, spring 34 acts to return the valves to their starting positions. During this return movement, valve 24 progressively enlarges the liquid-holding area of chamber 14 until it reaches its end of the chamber, at which time valve 22 will have entered the enlarged bore 26 to cut off the supply. At that moment, the full area of chamber 14 will be filled with liquid, held between the valve walls. A predetermined measured quantity will have been subtracted from the supply. And, as the valves continue their return movement, valve 24 leaves chamber 14, thereby permitting the measured liquid to pass into the outlet passage 16 and thence to the spout 18. A small vent 36 is provided in an upper wall of the discharge passage to ensure free outflow of liquid. Meanwhile valve 22 will have seated against shoulder 28 and the mechanism is in readiness for a repetition of the described cycle.

It is a feature of the invention that the shiftable valve unit is continually supported at at least two spaced apart bearing locations, at least one of the valves 22, 24 always constituting a bearing in addition to the bearing of rod 26 in the wall of outlet passage 16. Also, the illustrated means for mounting the valves on rod 26 provides a simple means for slight relative adjustments of the valves, to attain a proper coordination. The threaded engagement of the valve plate clamps with the threads 38 on rod 26 permits a desired amount of adjustment.

The invention, as above described, may be manually operated by gripping the end of rod 26, or a handle which may be secured at said end. But the measuring and dispensing mechanism may be effectively combined with a coin controlled unit, to serve the various purposes of vending machines, so called.

In the drawing, such a coin unit is indicated generally at 40, secured on a wall of casing 10. A usual plunger bar 42 normally projects a considerable distance out of casing 10, and has the coin receiving recess 44 therein. In the absence of a coin in recess 44, the mechanism locks against in-thrust of bar 42. When a coin of proper size is in place, however, in-thrust of bar 42 causes the coin to release the locking mechanism, and the bar can be pushed inward to the maximum degree. The coin is carried into the casing 10 and ultimately drops into a suitable receptacle such as the box 46.

The inner end of bar 42 moves in a path to engage the arm 32 reaching out from the valve rod 26. As bar 42 moves inward, it actuates the valves 22, 24 as heretofore described. And the coil spring 34 which returns the valves, causes bar 42 to be returned by being pushed by arm 32.

I claim as my invention:

1. In a liquid dispensing device, a measuring chamber, and means for controlling the passage of liquid to and from said chamber; said means comprising a pair of valves and a rod on which the valves are mounted in spaced apart relation; a shoulder interiorly of the chamber, facing toward the entrance to said chamber and constituting a seat for one of said valves seating in the direction of flow into said chamber; each said valve being adapted to enter with nice fit the bore of the chamber, one into each end thereof, and said valves being coordinated for one valve to be out of the chamber when the other is seated against said shoulder, and for both to be within the chamber at one stage of movement of the valves.

2. In a liquid dispensing device, a measuring chamber, and means for controlling the passage of liquid to and from said chamber; said means comprising a pair of valves and a rod on which the valves are mounted in spaced apart relation; a shoulder interiorly of the chamber, facing toward the entrance to said chamber and constituting a seat for one of said valves seating in the direction of flow into said chamber; each said valve being adapted to enter with nice fit the bore of the chamber, one into each end thereof, and said valves being coordinated for one valve to be out of the chamber when the other is seated against said shoulder, and for both to be within the chamber at one stage of movement of the valves; and means tending yieldingly to hold the valves in positions wherein one valve is seated against said shoulder.

BRYANT BIGELOW.